(12) United States Patent
Gupte et al.

(10) Patent No.: US 9,234,052 B2
(45) Date of Patent: Jan. 12, 2016

(54) ALKYL HYDROXYLAMINE COMPOUNDS AND THEIR USE FOR SHORTSTOPPING FREE RADICAL POLYMERIZATIONS

(71) Applicant: ANGUS Chemical Company, Buffalo Grove, IL (US)

(72) Inventors: Kaustubh Gupte, Mumbai (IN); Charles E. Coburn, Vernon Hills, IL (US); Mrunalini S. Dhamdhere, Vernon Hills, IL (US); Mahesh Sawant, Collegeville, PA (US)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 0 days.

(21) Appl. No.: 14/407,624

(22) PCT Filed: Jun. 13, 2013

(86) PCT No.: PCT/US2013/045586
§ 371 (c)(1),
(2) Date: Dec. 12, 2014

(87) PCT Pub. No.: WO2013/188632
PCT Pub. Date: Dec. 19, 2013

(65) Prior Publication Data
US 2015/0166689 A1   Jun. 18, 2015

(51) Int. Cl.
*C08F 2/42* (2006.01)
*C08F 2/24* (2006.01)
*C08F 36/04* (2006.01)
*C08F 236/10* (2006.01)

(52) U.S. Cl.
CPC ... *C08F 2/42* (2013.01); *C08F 2/24* (2013.01); *C08F 36/04* (2013.01)

(58) Field of Classification Search
CPC .......................................................... C08F 2/42
USPC .......................................................... 526/83
See application file for complete search history.

(56) References Cited

U.S. PATENT DOCUMENTS

| 3,148,225 | A | | 9/1964 | Albert |
| 3,296,177 | A | * | 1/1967 | Haines et al. ................. 524/239 |
| 5,384,372 | A | | 1/1995 | Lattime |
| 5,504,168 | A | | 4/1996 | Maestri et al. |
| 6,495,065 | B1 | | 12/2002 | Lou et al. |
| 6,723,255 | B2 | | 4/2004 | Buszta et al. |
| 2004/0019165 | A1 | | 1/2004 | Stiller et al. |

FOREIGN PATENT DOCUMENTS

| EP | 1 132 408 | 9/2001 |
| WO | 98/51714 A1 | 11/1998 |
| WO | 00/42079 A1 | 7/2000 |
| WO | WO-02/38617 | 5/2002 |
| WO | 02/088055 A1 | 11/2002 |

OTHER PUBLICATIONS

International Preliminary Report on Patentability on PCT/US2013/045586, issued Dec. 16, 2014.
International Search Report on PCT/US2013/045586, mailed Aug. 26, 2013.

* cited by examiner

*Primary Examiner* — Fred M Teskin
(74) *Attorney, Agent, or Firm* — Foley & Lardner LLP

(57) ABSTRACT

This invention provides a method for shortstopping free radical polymerization reactions using combinations of N-isopropylhydroxylamine (IPHA) or salts thereof with either primary or secondary alkyl hydroxylamines, or with at least two primary alkyl hydroxylamines. A method for producing elastomers using the aforesaid shortstopping agents is also provided.

12 Claims, No Drawings

ALKYL HYDROXYLAMINE COMPOUNDS AND THEIR USE FOR SHORTSTOPPING FREE RADICAL POLYMERIZATIONS

CROSS REFERENCE TO RELATED APPLICATIONS

This application is a 35 USC §371 national phase filing of PCT/US2013/045586 filed Jun. 13, 2013, which claims the benefit of Indian Application No. 1837/DEL/2012, filed Jun. 14, 2012.

FIELD OF THE INVENTION

This invention relates to a method for shortstopping free radical polymerization reactions using combinations of N-isopropylhydroxylamine (IPHA) or salts thereof with primary or secondary alkyl hydroxylamines, or their salts. A method for producing elastomers using the aforesaid shortstopping agents is also provided.

BACKGROUND OF THE INVENTION

Free radical initiated emulsion polymerization reactions for making elastomers, such as styrene-butadiene rubber, butadiene rubber and acrylonitrile-butadiene rubber, often involve use of shortstopping agents to terminate the polymerization reaction. The polymerization reaction is stopped at a predetermined degree of monomer conversion in order to produce a rubber product with the desired characteristics.

U.S. Pat. No. 3,148,225 teaches the use of N,N-dialkylhydroxylamines, such as N,N-dimethylhydroxylamine, as popcorn polymer inhibitors in the preparation of synthetic rubber. Previously and currently used shortstopping agents, however, are known to suffer from one or more drawbacks.

As discussed in U.S. Pat. No. 3,148,225 and European Patent No. EP1083185, N,N'-diethylhydroxylamine (DEHA) is a widely-used shortstopping agent, however, it is relatively volatile and is readily removed with the unreactive monomers during the steam stripping step. This in turn can result in insufficient DEHA present in the resulting latex emulsion to prevent additional free radical polymerization from occurring and can cause Mooney viscosity drift. Furthermore, subsequent emulsion polymerizations that utilize recovered and recycled monomer streams can contain excessive amounts of DEHA that will deactivate a portion of the initiator package and will ultimately require use of greater amounts of initiator. The use of DEHA can also result in the formation of precursors to regulated nitrosamines. DEHA is sometimes combined with non-volatile free radical scavengers such as sodium dimethyldithiocarbamate (SDD) or sodium tetrasulfide (ST) to reduce the Mooney viscosity drift of the resulting latex. However, SDD can lead to the formation of nitrosamine precursors and ST can generate toxic and corrosive hydrogen sulfide.

N-Isopropylhydroxylamine (IPHA) is also widely used as a shortstopping agent and has the advantage of providing excellent Mooney viscosity control while not contributing to the formation of any regulated nitrosamines, as discussed in U.S. Pat. No. 5,384,372. IPHA is capable of providing control of undesired vapor phase polymer formation (popcorn polymer), however, its efficacy can be variable depending on plant conditions.

European Patent No. EP 1 083 185 describes the use of nitrosamine inhibitors with secondary alkylhydroxylamines that are otherwise capable of producing nitrosamines in emulsion and rubber processes. The benefits and drawbacks of IPHA and DEHA are discussed in this patent document.

IPHA or its salts may, for example without limitation, be selected from the group consisting of N-isopropylhydroxylamine, N-isopropylhydroxylamine acetate, N-isopropylhydroxylamine hydrochloride, N-isopropylhydroxylamine sulfate, and mixtures thereof.

A blend of IPHA and hydroxylamine (HA) is presented in International Patent Application Publication No. WO 2002/0038617 as a nitrosamine-free shortstopping agent having better prevention of popcorn polymer formation than IPHA alone. Hydroxylamine, however, rapidly decomposes, particularly in the presence of metal ions, which creates significant storage and handling issues. On the other hand, U.S. Pat. No. 5,504,168 describes blends of IPHA with polysulphides used as shortstopping agents for emulsion polymerization systems.

International Patent Application Publication No. WO 1998/0051714 teaches the use of N-ethylhydroxylamine (EHA) or its salts as a shortstopping agent for free radical polymerization. This document states that EHA is less volatile than DEHA and IPHA and it can be mixed with other shortstopping agents such as IPHA, DEHA, sodium polysulfide, and sodium dimethyldithiocarbamate. Furthermore, EHA does not produce undesirable nitrosamines.

International Patent Application Publication No. WO 2000/0042079 discloses sterically-hindered alkyl hydroxylamines, such as N-tertiary-butylhydroxylamine and N,N-isopropylmethylhydroxylamine, and their use as free radical scavengers and shortstopping agents.

U.S. Pat. No. 6,723,255 describes shortstopping compositions which contain at least one hydrophilic radical scavenger and at least one hydrophobic radical scavenger. It is shown in this document that shortstopping agents having fewer carbon atoms have greater volatility and water solubility.

In view of the foregoing practices and developments, there remains a need for new and improved shortstopping agents which exhibit at least two or more of the following properties: 1) excellent shortstopping/Mooney viscosity control, 2) good storage stability/EH&S profile, 3) do not form detectable levels of regulated nitrosamines, and 4) can provide consistent popcorn polymer control.

SUMMARY OF THE INVENTION

The present invention is a method for terminating a free radical initiated emulsion polymerization reaction comprising adding, to an emulsion comprising at least one monomer, a shortstopping agent comprising isopropylhydroxylamine (IPHA) or salts thereof and at least one alkyl hydroxylamine compound which is different from said IPHA or salts thereof and is selected from the group consisting of a primary alkyl hydroxylamine, a secondary alkyl hydroxylamine, and mixtures thereof.

In one embodiment, the alkyl hydroxylamine is a primary alkyl hydroxylamine selected from the group consisting of N-methylhydroxylamine (MHA), N-ethylhydroxylamine (EHA), N-propylhydroxylamine (PHA), N-tertiary-butylhydroxylamine (TBHA), and mixtures thereof.

In some embodiments, the IPHA or its salts and the primary or secondary alkyl hydroxylamine are present in the shortstopping agent in a molar ratio of IPHA:alkyl hydroxylamine of from 40:1 to 1:1.

For example, the primary alkyl hydroxylamine may be TBHA, where the IPHA or its salts and TBHA are present in the shortstopping agent in a molar ratio of IPHA:TBHA of 5:1.

In some embodiments the shortstopping agent comprises from 1 to 20% by weight of IPHA, based on the total weight of hydroxylamines present, and at least two primary alkyl hydroxylamines (AHAs). In these embodiments, the IPHA or its salts and the at least two primary alkyl hydroxylamines are present in the shortstopping agent in a molar ratio of IPHA: primary AHAs of from 0.02:1 to 0.1:1. Generally, the shortstopping agent may comprise from 30-90% by weight of a solvent, based on the total weight of the shortstopping agent. The solvent may for example, comprise water.

The shortstopping agent may be added to the emulsion in an amount of from 0.01 to 0.25 parts (active basis) per hundred parts of said monomer (phm).

The present invention also provides a method for producing an elastomer comprising the steps of:
1) conducting a free-radical polymerization of a latex containing a conjugated diene;
2) adding a shortstopping agent comprising isopropylhydroxylamine (IPHA) or salts thereof and at least one alkyl hydroxylamine compound, which is different from said IPHA or salts thereof, and is selected from the group consisting of a primary alkyl hydroxylamine, a secondary alkyl hydroxylamine, and mixtures thereof; and
3) processing the polymerized material to form said elastomer.

In some embodiments, the elastomer may be a rubber selected from the group consisting of styrene-butadiene rubber, butadiene rubber and acrylonitrile-butadiene rubber.

DETAILED DESCRIPTION OF THE INVENTION

The terms "parts" and "phm (parts per hundred monomers)," as employed in the following examples, refers to parts by weight of shortstopping agent per 100 parts of monomer charged. The dosage and ranges of shortstopping agent are noted on active basis of the substance, not as supplied product concentration.

There is a method disclosed for terminating free radical initiated emulsion polymerization reactions by the addition of a shortstopping agent which is a combination of isopropylhydroxylamine (IPHA) or its salts and at least one primary or 25 secondary alkylhydroxylamine.

The inventive combinations provide excellent shortstopping/Mooney viscosity control, have very good storage stability/handling issues, and provide good popcorn polymer control. In addition, the combinations which include primary alkyl hydroxylamines do not form nitrosamine precursors and allows manufacture of rubber compliant with the German TRGS 552 regulation.

The IPHA or its salts may, for example without limitation, be selected from the group consisting of N-isopropylhydroxylamine, N-isopropylhydroxylamine acetate, N-isopropylhydroxylamine hydrochloride, N-isopropylhydroxylamine sulfate, and mixtures thereof. N-isopropylhydroxylamine is commercially available from ANGUS Chemical Company of Buffalo Grove, Ill.

Suitable primary alkyl hydroxylamines and their salts may, for example without limitation, be selected from the group consisting of N-methylhydroxylamine (MHA), N-ethylhydroxylamine (EHA), N-propylhydroxylamine (PHA), N-tertiary-butylhydroxylamine (BHA), and mixtures thereof. Such IPHA/primary alkyl hydroxylamine combinations provide excellent shortstopping/Mooney viscosity control, are stable, the chemistry is non-nitrosamine generating, as well as providing good popcorn polymer control.

Suitable secondary alkylhydroxylamines may, for example without limitation, be selected from the group consisting of N,N-dimethylhydroxylamine (DMHA), N,N-isopropylmethylhydroxylamine (IPMHA), and mixtures thereof. These combinations provide good shortstopping, excellent Mooney viscosity control, and popcorn polymer control. Some secondary alkyl hydroxylamines are capable of forming nitrosamine precursors, so they are less desirable than the primary alkyl hydroxylamines in combination with IPHA.

In embodiments having IPHA or its salts and a primary or secondary AHA, these ingredients are present in the shortstopping agent in a molar ratio of IPHA:(total primary or secondary AHAs) of from 40:1 to 1:1. For example, the molar ratio of IPHA:(total primary or secondary AHAs) present in the shortstopping agent may, without limitation, be from 20:1 to 2:1, or even from 15:1 to 2:1, such as 10:1 to 1:1.

In some embodiments, the shortstopping agent of the present invention comprises only from 1 to 20% by weight of IPHA, based on the total weight of hydroxylamines present, and at least two primary alkyl hydroxylamines (AHAs). In these embodiments, the IPHA or its salts and the at least two primary alkyl hydroxylamines are present in the shortstopping agent in a molar ratio of IPHA:primary AHAs of from 0.01:1 to 0.1:1, such as for example, from 0.02:1 to 0.1:1. For example, without limitation, a shortstopping agent in accordance with the present invention may comprise from 1 to 20 wt % IPHA, from 50-70 wt % EHA and from 29-49 wt % TBHA, based on the total weight of all the AHAs present. In particular, the shortstopping agent may comprise 10 wt % IPHA, 50 wt % EHA and 40 wt % TBHA, or, for example, 2 wt % IPHA, 55 wt % EHA and 43 wt % TBHA. These blends containing relatively low amount of IPHA, along with at least two primary AHAs, should provide favorable liquid-gas phase distribution of the shortstopping active ingredients (i.e., the AHAs), thereby providing acceptable short-stopping effectiveness in the vapor phase as well as the liquid phase. Furthermore, in order to ensure higher activity of the shortstopping agent in the organic (i.e., latex) phase during radical polymerization reactions, it is beneficial to have higher solubility of the active ingredients (e.g., AHA's) in organic solvents to facilitate its migration from the aqueous to the organic phase.

In embodiments having IPHA and at least two primary AHAs, these ingredients are present in the shortstopping agent in a molar ratio of IPHA:(total primary AHAs) of from 0.02:1 to 0.1:1. For example, the molar ratio of IPHA:AHA present in the shortstopping agent may, without limitation, be from 20:1 to 2:1, or even from 15:1 to 2:1, such as 10:1 to 1:1.

In accordance with the present invention, the amount of shortstopping agent (active ingredients, IPHA-AHAs blends) used may be from about 0.01 to 0.25 parts (active basis) per hundred parts of monomer (phm), for example, without limitation about 0.03 to about 0.2 phm. The manner by which the shortstopping agent is added to the emulsion is not particularly limited and should be commensurate with conventional techniques used in rubber polymerization processes. For example, the blend of IPHA and AHA(s) may first be combined with a solvent, such as water, and then added to the emulsion when the desired monomer conversion has been reached.

The shortstopping agent of the present invention, comprising a blend of IPHA and either a primary or secondary AHAs, or at least two primary AHAs (hereinafter referred to as "IPHA:AHA shortstopping agents"), may be advantageously employed in any addition polymerization system which proceeds through a free radical emulsion polymerization mechanism. The emulsion polymerization process may be performed in a batch-wise or continuous mode. The method of the present invention may, for example, be advantageously applied to emulsion polymerization reactions which produce styrene-butadiene rubber (SBR), butadiene rubber (BR) and acrylonitrile-butadiene rubber (NBR) and polychloroprene.

Moreover, the method of the present invention is not dependent on the free radical polymerization reaction using any particular initiator, activator, reducing agent, complex forming agent, buffer, oxygen-combining substances, emulsifier, dispersing agent, modifier, and the like. As is common, a chain transfer agent may be used to avoid excessive gel formation and control the average molecular weight. The type of chain transfer agent employed is also not particularly limited in accordance with the present invention. Other shortstopping agents and radical scavengers may also be combined with the IPHA-AHA shortstopping agent described herein, including for example, without limitation, DEHA, sodium dimethyldithiocarbamate, sodium tetrasulphide, hydroxylamine, ethylhydroxylamine, sodium nitrite.

The temperature of the polymerization may range from 0° C. to 100° C. If a hot polymerization recipe is used, the temperature of the polymerization generally ranges from about 40° C. to about 70° C. A hot polymerization is generally carried out to monomer conversion ranging from 80% to 90%. The temperature of a cold polymerization generally ranges from about 0° C. to 25° C. The cold polymerization is generally carried out to monomer conversion ranging from about 55% to 65%.

Although IPHA has been shown to provide popcorn polymer control, its performance can be variable depending on the plant's design and conditions used to make the rubber. The IPHA-AHA shortstopping agents used in the method of the present invention provide more consistent and robust popcorn polymer control compared to using IPHA alone as the shortstopping agent. These shortstopping agents also provide better overall shortstopping performance versus DEHA-based shortstopping agents. In fact, when the IPHA is combined with at least one primary alkylhydroxylamine, in accordance with the present invention, the regulated nitrosamines contained in the resulting rubber products are below detectable levels compared to rubbers produced by emulsion polymerization reactions shortstopped with DEHA-based shortstops. Lastly, the need for additional free radical scavengers in monomer recovery portions of the emulsion polymerization reactions areas of the polymerization plant is reduced when the IPHA-AHA shortstopping agents described herein are employed in accordance with the method of the present invention.

The practice of this invention is further illustrated by reference to the following examples which are intended to be representative rather than restrictive of the scope of this invention.

EXAMPLES

Preparation of the Inventive Compositions

IPHA with a Primary or Secondary AHA

The various IPHA based blends were prepared by stirring together the commercial product, CHAINGUARD I-15 Hydroxylamine (15% IPHA/85% water) available from the ANGUS Chemical Company) with the desired second alkylhydroxylamine under nitrogen. The second alkylhydroxylamine was prepared separately by known procedures found in the open literature. By altering the relative amounts of the IPHA used and the desired alkylhydroxylamine added, the ratio of the IPHA to the desired alkylhydroxylamine could be achieved. Furthermore, by altering the amount of deionized, de-oxygenated water present in the initial amount of the CHAINGUARD I-15, the concentration of the blend could be adjusted to the desired level.

Shortstopping Performance Studies

Polymerization of styrene and butadiene was carried out in the lab using a standard recipe for SBR (styrene butadiene rubber) polymerization.

The standard inhibitor in styrene, t-butyl catechol (TBC), was removed prior to use. To the styrene, an aqueous mixture of the emulsifiers was added and equilibrated to a reaction temperature of 10° C. This was followed by addition of condensed butadiene monomer and equilibration to 10° C. Finally, the activator mixture was added and the polymerization begun. The reaction was run until a pre-determined conversion level was reached, typically 60% for SBR. At that time the shortstopping agent was injected. The amount of shortstop used at injection was 0.04 parts (active basis) per hundred monomers. The shortstop was well-mixed into the emulsion. Samples of latex were withdrawn from the reaction bottles and the % conversion of monomers to polymer was determined by gravimetric analysis on the sample (initial conversion $X_0$). The rest of the latex was aged and the % conversion was measured again at various time intervals ($X_t$).

The increase in % conversion was calculated as "the conversion at the aged time"–"initial conversion" ($X_t$-$X_0$).

Mooney viscosity is used in the industry as a key specification property for SBR. It is not a viscosity measurement in the true sense of the scientific term, but instead a measure of shearing torque averaged over a range of shear rates for the polymer. The Mooney viscosity of a sample depends upon the average molecular weight (chain length) and polydispersity of the macromolecular chains. When an SBR polymerization is carried out, the extent of monomer conversion to polymers will be an indication of the Mooney viscosity of the resultant rubber. Once the rubber is coagulated from the latex, it is still possible for the Mooney viscosity to change with time due to chain activity from re-combining of a small number of polymer chains. Based on this insight, we have used % conversion as an indicator for the Mooney viscosity of the rubber.

Experimental data for SBR polymerization reactions shortstopped using inventive compositions are provided in Table 1 below.

TABLE 1

Increase in % conversion ($X_t$-$X_0$).

| Aging Time (hr) | IPHA (comparative control) | DEHA (comparative control) | 5:1 IPHA/MHA (comparative control) | 1:1 IPHA/MHA | 5:1 IPHA/HA | 9:1 IPHA/PHA | 1:1 IPHA/DMHA | 5:1 IPHA/DMHA | 1:1 IPHA/IPMHA | 5:1 IPHA/IPMHA |
|---|---|---|---|---|---|---|---|---|---|---|
| 0 | 0 | 0 | 0 | 0 | 0 | 0 | 0 | 0 | 0 | 0 |
| 24 | 1.83 | 1.37 | 1.14 | 1.71 | 2.07 | 1.55 | 3.97 | 3.06 | 4.95 | 3.90 |
| 48 | 1.91 | 9.34 | 0.41 | 0.97 | 0.22 | 2.46 | 4.98 | 3.29 | 8.75 | 4.73 |

As shown by the data presented above, the shortstopping agents in accordance with present invention, which comprise IPHA and at least one primary or secondary alkyl hydroxylamine, are effective shortstopping agents. Compared to DEHA, the mixtures containing IPHA and MHA or PHA are better at controlling conversion, and thus Mooney viscosity drift, as the sample ages.

Stability Studies

The various blends claimed were tested for their thermal stability in the presence of stainless steel 316 (SS316) or carbon steel 1010 (CS1010) metal filings using a dynamic scanning calorimeter (DSC). These metals were selected as they are representative of environments typically encountered by our current product offering (CHAINGUARD I-15) and are environments that would reasonably be expected to contact the novel IPHA-based blends described in this disclosure. The tests were performed on a 15.8:3.2 wt % (5:1 ratio) aqueous solution of IPHA to the blend alkylhydroxylamine (e.g. MHA, PHA, TBHA, DMHA, IPMHA, and DEHA). The results are summarized in Table 2 below.

TABLE 2

Onset of Decomposition by DSC (° C.)

| Metal | IPHA (Comparative Control) | IPHA/HA (Comparative Control) | IPHA/MHA | IPHA/PHA | IPHA/TBHA | IPHA/IPMHA | IPHA/DMHA |
|---|---|---|---|---|---|---|---|
| SS 316 | 147 | 79 | 128 | 166 | 140 | 142 | 155 |
| CS 1010 | 132 | 86 | 143 | 138 | 149 | 150 | 161 |

Clearly, the comparative IPHA/HA blend, as described in International Patent Application Publication No. WO 02/38617 is not as compatible with the typical materials of construction that the commercial IPHA product encounters as it degrades at a much lower temperature than any of the IPHA-based blends. In light of this, it is clear that the IPHA/HA blend is not suitable for long term shipping or storage in SS316 or CS1010.

Distribution Ratio Studies

1% active solutions were prepared for all the alkylhydroxylamines under evaluation. A certain weight was loaded into the test flask set in a water bath. The flask was equipped with a vaporizer arm and was further connected with a condenser arm. The water bath was equipped to heat to solution to 85-90° C. The assembly was maintained under vacuum at 20.5 inches Hg. Extra care was taken to ensure that condensation would not occur in the upper areas of this assembly. The system was allowed to reach equilibrium. Once equilibrium was reached, the stopcock in the upper condenser was activated such that the condensate could be collected. After desired amount was collected, the vacuum was slowly released and weights of solutions in the original flask and condensate flask were recorded. The amount of active alkylhydroxylamines in these were further determined, as reported in Table 3.

TABLE 3

| Compound | Vapor/Liquid Distribution ratio |
|---|---|
| Isopropylhydroxylamine | 1.46 |
| Diethylhydroxylamine | 6.31 |
| Methylhydroxylamine | 0.36 |

Popcorn Inhibition Studies

Popcorn polymer is a highly crosslinked material which can form in the monomer recovery areas of processes containing dienes such as butadiene; these processes include manufacturing of SBR, NBR, BR, and polychloroprene. Popcorn polymer is insoluble in organic solvents, and can cause costly maintenance shutdowns. Popcorn inhibition studies were performed in the lab by using an active popcorn seed from Styrene-butadiene emulsion polymerization. This seed was exposed to uninhibited monomer under conditions relevant in the industrial emulsion polymerization process. The effect of inhibition using the alkylhydroxylamines was observed over days, noting the number of days of protection offered by each of the alkylhydroxylamines.

Following results were obtained in lab studies for popcorn polymer inhibition conducted on several alkylhydroxylamines as shown in Table 4.

TABLE 4

| | Time to develop popcorn polymer |
|---|---|
| No inhibitor | 6 days |
| Diethylhydroxylamine | 13 days |
| Isopropylhydroxylamine | 15 days |
| Methylhydroxylamine | 18 days |

Modelling Characteristics of Inventive Compositions—Low IPHA Blended with at Least Two Primary AHAs It is believed that adequate partitioning of the shortstopping agents into the organic phase is required to stabilize the organic phase, it is believed that using less IPHA in shortstopping blends, along with more of other primary AHAs which have beneficial characteristics relevant to these desired properties, should produce better performing shortstopping agents. To estimate these properties of such low-IPHA containing blends, computer-based models were used to predict the distribution ratios and partitioning coefficient into organic phase of low-IPHA containing blends with at least two primary AHAs, in different relative amounts, as listed in the examples below.

The particular computer modelling software and inputs used are as follows:
Software Name: Gaussian
Company/Manufacturer: Gaussian Inc.
Version: Gaussian 09
Used for: Calculating reactivities of AHA.
Electronic energies, vibrational frequencies, rotational constants were calculated at CBS-QB3 level of theory
Rate constants were calculated using canonical transition state theory.
Tunnelling effect was calculated using Skodje-Truhlar method.
Rate constants were calculated for H-atom abstraction reactions using ethyl radical from AHAs.
Software Names:
Turbomole
COSMOtherm
Company/Manufacturer: COSMOlogic GmbH
Versions:
TURBOMOLE V5-5
COSMOtherm X11 C_21_0111_a, parameterization file: BP_TZVP_C21_0111.ctd
Used for: Distribution ratio (DR) calculations and partition coefficient calculations.
Turbomole was used for quantum chemical calculations.
COSMOtherm was used to predict DR and partition coefficient using Turbomole generated COSMO files.
DR was calculated at 1 wt % AHA in water at 70*C To improve accuracy of DR calculations, COSMOtherm requires experimental vapor pressure data. The vapor pressure data provided to COSMOtherm as an input is given below:

| T (*C.) | PVtot (mPa) |
|---|---|
| 0.0 | 0.3 |
| 15.8 | 1.4 |
| 31.6 | 5.2 |
| 47.3 | 16.5 |
| 63.1 | 44.8 |
| 78.9 | 106.9 |
| 94.7 | 228.2 |
| 110.4 | 442.7 |
| 126.2 | 791.0 |
| 142.0 | 1317.6 |

| T (*C.) | PVtot (mPa) |
|---|---|
| 0.0 | 0.4 |
| 15.0 | 1.5 |
| 30.0 | 5.5 |
| 45.0 | 16.9 |
| 60.0 | 45.2 |
| 75.0 | 106.9 |
| 90.0 | 227.3 |
| 105.0 | 440.9 |
| 120.0 | 789.7 |
| 135.0 | 1320.4 |

| T (*C.) | PVtot |
|---|---|
| 0.0 | 0.7 |
| 14.2 | 2.6 |
| 28.4 | 8.6 |
| 42.7 | 24.6 |
| 56.9 | 62.2 |
| 71.1 | 140.9 |
| 85.3 | 290.1 |
| 99.6 | 549.2 |
| 113.8 | 966.0 |
| 128.0 | 1593.7 |

Predicted Reactivity Orders of AHAs: EHA≥IPHA>TBHA

Various AHA Solubilities at 25° C. (experimentally measured)
EHA~50%
IPHA~20%
TBHA~12%

Ethylbenzene was used in lieu of the organic phase for modelling purposes. The extent of partitioning, i.e., the partitioning coefficient, in organic phase (ethylbenzene) is calculated by predicting the quantity:

$$\frac{X_{AHA(EB)}}{X_{AHA(H2O)}},$$

which is the ratio of total mole fraction of AHA in ethylbenzene to total mole fraction of AHA in water. $X_{AHA(EB)}/X_{AHA(H2O)} \geq 1$ will be desired.

The distribution ratio and partitioning coefficient was calculated and predicted by the above-mentioned software models as reported in Table 5 below:

TABLE 5

| Blend ID | DEHA (wt %) | IPHA (wt %) | EHA (wt %) | TBHA (wt %) | DR** (70° C.) | Partition Coefficient*** |
|---|---|---|---|---|---|---|
| Comp. 1 | | 100 | | | 5.36 | 1.6 |
| Comp. 2 | 100 | | | | 52.96 | 29.56 |
| A | | 10 | 50 | 40 | 6.52 | 1.03 |
| B | | 5 | 55 | 40 | 6.37 | 0.95 |
| C | | 2 | 55 | 43 | 6.57 | 0.98 |
| D | | 2 | 58 | 40 | 6.28 | 0.91 |

* Comp. = Comparative
**DR = Distribution Ratio predicted by COSMOtherm software
***$X_{AHA(EB)}/X_{AHA(H2O)}$ as predicted by COSMOtherm software, at 25° C.

The modeling results are known to deviate from the experimental findings. Owing to this uncertainty, the predictions should be viewed on a comparative basis.

We claim:
1. A method for terminating a free radical initiated emulsion polymerization reaction comprising adding, to an emulsion comprising at least one monomer, a shortstopping agent comprising N-isopropylhydroxylamine (IPHA) or salts thereof and at least one alkyl hydroxylamine compound which is different from said IPHA or salts thereof and is selected from the group consisting of a primary alkyl hydroxylamine, a secondary alkyl hydroxylamine, and mixtures thereof, wherein said at least one alkyl hydroxylamine comprises N-tertiary-butylhydroxylamine (TBHA).

2. The method according to claim 1, wherein said at least one alkyl hydroxylamine is a primary alkyl hydroxylamine selected from the group consisting of N-methylhydroxylamine (MHA), N-ethylhydroxylamine (EHA), N-propylhydroxylamine (PHA), and mixtures thereof.

3. The method according to claim 1, wherein said IPHA or its salts and said at least one alkyl hydroxylamine are present in said shortstopping agent in a molar ratio of IPHA:alkyl hydroxylamine of from 40:1 to 1:1.

4. The method according to claim 1, wherein IPHA or its salts and TBHA are present in said shortstopping agent in a molar ratio of IPHA:TBHA of 5:1.

5. The method according to claim 1, wherein said at least one alkyl hydroxylamine further comprises at least a second primary alkyl hydroxylamine selected from the group consisting of N-methylhydroxylamine (MHA), N-ethylhydroxylamine (EHA), N-propylhydroxylamine (PHA), and mixtures thereof.

6. The method according to claim 5, wherein said second primary alkyl hydroxylamine is N-ethylhydroxylamine (EHA).

7. The method according to claim 5, wherein said IPHA or its salts and TBHA and said second primary alkyl hydroxylamine are present in said shortstopping agent in a molar ratio of IPHA:(TBHA and said second alkyl hydroxylamine) of from 0.02:1 to 0.1:1.

8. The method according to claim 1, wherein said shortstopping agent comprises from 30-90% by weight of a solvent, based on the total weight of the shortstopping agent.

9. The method of claim 1, wherein said shortstopping agent is added to said emulsion in an amount of from 0.01 to 0.1 parts per hundred parts of said monomer (phm).

10. The method of claim 1, wherein the shortstopping agent comprises 1-20 wt % IPHA, 50-70 wt % EHA, and 29-49 wt % TBHA, based on the total weight of all the alkyl hydroxylamines present.

11. A method for producing an elastomer comprising the steps of:
   1) conducting a free-radical polymerization of a latex comprising a conjugated diene;
   2) adding a shortstopping agent comprising N-isopropylhydroxylamine (IPHA) or salts thereof and at least one alkyl hydroxylamine compound, which is different from said IPHA or salts thereof, and is selected from the group consisting of a primary alkyl hydroxylamine, a secondary alkyl hydroxylamine, and mixtures thereof, wherein said at least one alkyl hydroxylamine comprises the primary alkyl hydroxylamine N-tertiary-butylhydroxylamine (TBHA); and
   3) processing the polymerized material to form said elastomer.

12. The method according to claim 11, wherein said elastomer is a rubber selected from the group consisting of styrene-butadiene rubber, butadiene rubber and acrylonitrile-butadiene rubber.

* * * * *